United States Patent
Kleers et al.

(10) Patent No.: US 7,912,055 B1
(45) Date of Patent: Mar. 22, 2011

(54) METHOD AND APPARATUS FOR CONFIGURATION AND ANALYSIS OF NETWORK MULTICAST ROUTING PROTOCOLS

(75) Inventors: Udi Kleers, Elmsford, NY (US); Jerry Y. Goldman, New City, NY (US)

(73) Assignee: EMC Corporation, Hopkinton, MA (US)

( * ) Notice: Subject to any disclaimer, the term of this patent is extended or adjusted under 35 U.S.C. 154(b) by 1309 days.

(21) Appl. No.: 11/211,250

(22) Filed: Aug. 25, 2005

Related U.S. Application Data

(60) Provisional application No. 60/604,325, filed on Aug. 25, 2004.

(51) Int. Cl.
*H04L 12/28* (2006.01)

(52) U.S. Cl. ........ 370/390; 370/218; 370/242; 370/396; 370/386

(58) Field of Classification Search ................ 370/432, 370/473, 351, 390, 401, 392; 702/200
See application file for complete search history.

(56) References Cited

U.S. PATENT DOCUMENTS

| | | | | |
|---|---|---|---|---|
| 5,067,094 A * | 11/1991 | Hayes | ............... | 702/51 |
| 5,309,448 A * | 5/1994 | Bouloutas et al. | .............. | 714/25 |
| 5,528,516 A * | 6/1996 | Yemini et al. | .............. | 702/181 |
| 5,646,864 A * | 7/1997 | Whitney | .............. | 714/47 |
| 5,661,668 A * | 8/1997 | Yemini et al. | .............. | 702/186 |
| 5,946,373 A * | 8/1999 | Harris | .............. | 379/14.01 |
| 6,253,339 B1 * | 6/2001 | Tse et al. | .............. | 714/47 |
| 6,331,983 B1 * | 12/2001 | Haggerty et al. | .............. | 370/400 |
| 6,484,209 B1 * | 11/2002 | Momirov | .............. | 709/238 |
| 6,526,054 B1 * | 2/2003 | Li et al. | .............. | 370/390 |
| 6,594,703 B1 * | 7/2003 | Li | .............. | 709/235 |
| 6,707,795 B1 * | 3/2004 | Noorhosseini et al. | .............. | 370/242 |
| 6,744,739 B2 * | 6/2004 | Martin | .............. | 370/254 |
| 6,795,433 B1 * | 9/2004 | Li | .............. | 370/389 |
| 6,914,907 B1 * | 7/2005 | Bhardwaj et al. | .............. | 370/432 |
| 6,950,424 B2 * | 9/2005 | Galand et al. | .............. | 370/351 |
| 7,133,371 B2 * | 11/2006 | Helm et al. | .............. | 370/270 |
| 7,293,287 B2 * | 11/2007 | Fischman et al. | .............. | 726/22 |
| 7,310,335 B1 * | 12/2007 | Garcia-Luna-Aceves et al. | .............. | 370/390 |
| 7,333,491 B2 * | 2/2008 | Chen et al. | .............. | 370/392 |
| 7,382,781 B1 * | 6/2008 | Sridhar et al. | .............. | 370/395.21 |
| 7,389,359 B2 * | 6/2008 | Jain et al. | .............. | 709/238 |
| 7,450,495 B2 * | 11/2008 | Guerin et al. | .............. | 370/217 |
| 2001/0034793 A1 * | 10/2001 | Madruga et al. | .............. | 709/238 |
| 2002/0051449 A1 * | 5/2002 | Iwata | .............. | 370/389 |

(Continued)

OTHER PUBLICATIONS

Smarts; ("IP Discovery Guide Supplement for Network Protocols"); 2004; pp. 1-36.*

(Continued)

*Primary Examiner* — Ricky Ngo
*Assistant Examiner* — Dewanda Samuel
(74) *Attorney, Agent, or Firm* — Krishnendu Gupta; Joseph D'Angelo

(57) ABSTRACT

A method and apparatus for operating on a system containing a plurality of components in communication using multicast communication protocol is disclosed. The method comprises the steps of representing selected ones of the plurality of components, the relationship among the components and the associated with the communication protocols, determining a mapping between a plurality of events and a plurality of observable events occurring among the components and among the communication protocols, wherein the mapping is represented as a value associating each event with each observable event, and performing the system operation in conjunction with the relationship between the events and observable events. The operations may be selected from the group of monitoring, discovering, managing, analyzing and displaying the components associated with the multicast protocols.

9 Claims, 15 Drawing Sheets

U.S. PATENT DOCUMENTS

2002/0152185 A1* 10/2002 Satish Jamadagni .............. 706/1
2003/0046390 A1* 3/2003 Ball et al. ...................... 709/224
2004/0015583 A1* 1/2004 Barrett et al. ................. 709/224
2005/0097146 A1* 5/2005 Konstantinou et al. ....... 707/200
2006/0018333 A1* 1/2006 Windisch et al. ............. 370/432

OTHER PUBLICATIONS

Smarts; ( "Network Protocol Manager for OSPF User's Guide"); 2004; pp. 1-98.*

* cited by examiner

PIM SESSION

MULTICAST SOURCE DISCOVERY PROTOCOL (MSDP)

FIG. 6A

| ENTITY | DIAGNOSIS | EXPLANATION |
|---|---|---|
| MulticastService | SvcImpacted | THE MULTICAST FUNCTIONALITY OF THIS DEVICE IS IMPACTED BY A PHYSICAL FAILURE |
| MulticastService | RpImpacted | THE FUNCTIONALITY OF THIS RENDEZVOUS POINT IS IMPACTED BY A PHYSICAL FAILURE |
| MulticastService | MulticastUpstreamImpact | THIS MULTICAST SERVICE IS IMPACTED BY A PROBLEM IN UPSTREAM MULTICAST DEVICE |
| PimInterface | Impacted | THE PIM INTERFACE IS NOT OPERATIONAL DUE TO A LAYER 2 OR LAYER 3 FAILURE |
| IGMPInterface | Impacted | THE IGMP INTERFACE IS NOT OPERATIONAL DUE TO A LAYER 2 OR LAYER 3 FAILURE |
| PIMHop | Impacted | THE MULTICAST HOP IS NOT AVAILABLE DUE TO PHYSICAL OR LOGICAL FAILURE |
| MulticastPath | Impacted | THE MULTICAST PATH IS NOT AVAILABLE DUE TO PHYSICAL OR LOGICAL FAILURE |

FIG. 6B

| ENTITY | DIAGNOSIS | EXPLANATION |
|---|---|---|
| MulticastRedundancyGroup | ReducedRedundancy | ONE MEMBER WITHIN THE REDUNDANCY GROUP IS DOWN |
| MulticastRedundancyGroup | AtRisk | ONLY ONE MEMBER IN THE REDUNDANCY GROUP IS UP |

| ENTITY | DIAGNOSIS | EXPLANATION |
|---|---|---|
| PIM INTERFACE | DR ADDRESS CHANGED | THE MULTICAST DR ADDRESS HAS CHANGED |
| MULTICAST GROUP | EXCESSIVE TRAFFIC | THE TRAFFIC HAS EXCEEDED THE THRESHOLD FOR A SPECIFIC MULTICAST GROUP ON SPECIFIC DEVICE |

METHOD AND APPARATUS FOR CONFIGURATION AND ANALYSIS OF NETWORK MULTICAST ROUTING PROTOCOLS

CLAIM OF PRIORITY

The instant application claims the benefit, pursuant to 35 USC 119(e), of the earlier filing date of that patent application entitled "Method and System for Model-Based Network Protocol Discovery and Identification," filed in the US Patent Office on Aug. 25, 2004 and afforded Ser. No. 60/604,325, the contents of which are incorporated by reference herein.

RELATED APPLICATION

The instant application is related to commonly owned:
U.S. patent application Ser. No. 11/211,234 entitled "Method and Apparatus for Configuration and Analysis of Network Routing Protocols," concurrently filed and U.S. patent application Ser. No. 11/034,192, entitled "Method and Apparatus for Event Correlation and Problem Reporting," filed on Jan. 12, 2005; U.S. patent application Ser. No. 10/400,718, entitled "Method and Apparatus for Event Correlation and Problem Reporting," now U.S. Pat. No. 6,868,367, filed on Mar. 23, 2003; U.S. patent application Ser. No. 08/893,263, entitled "Apparatus and Method for Event Correlation and Problem Reporting," now U.S. Pat. No. 6,249,755, filed on Jul. 15, 1997; U.S. patent application Ser. No. 08/679,443, entitled "Apparatus and Method for Analyzing and Correlating Events in a System Using a Causality Matrix," now U.S. Pat. No. 5,661,668, filed on Jul. 12, 1996; and U.S. patent application Ser. No. 08/249,282; entitled "Apparatus and Method for Event Correlation and Problem Reporting," now U.S. Pat. No. 5,528,516, filed on May 25, 1994, the contents of all of which are incorporated by reference herein.

FIELD OF THE INVENTION

The present invention is related to the field of distributed systems, and more particularly, to the discovery, identification and management of network multicast protocol configurations and operations.

BACKGROUND

Protocol Independent Management (PIM) is a routing scheme using existing unicast routing protocols, e.g., RIP, OSPF, BGP etc., that provides a mechanism to send IP data packets to a set of receivers, while reducing as much as possible the number of replicated data packets. Multicast protocols enable the delivery of information from a sender to a set of receivers. It is a generalization of the concept of unicast transmission, where the information is transmitted from a sender to a single receiving network. It is also a generalization of a broadcast, where the information is transmitted from a sender to all possible destinations.

FIG. 1 illustrates an exemplary unicast protocol delivery system 100 wherein source node 110 provides information to each of the receiving networks 140.1, 140.2, 140.3 through network 115. In this illustrative example, source node 110 is required to know in advance the associated receiver addresses and each data packet is replicated at the source to provide one copy for each receiver.

FIG. 2 illustrates an exemplary IP Multicast protocol system that improves upon the simple unicast transmission shown in FIG. 1, wherein IP packets are sent to every interface, of a router i.e., node 1301, in the broadcast domain. In the illustrated case, source 110 needs only to know a multicast group address. A multicast group represents a group of receivers, illustrated as receiving networks 140.1, 140.2, 140.3, that participate in the multicast communication. In this case, the IP packets are replicated as close to the receiver as possible. For example, the replication of packets destined to the receiving networks in Group ABC is performed at the node 130.1 attached of the receivers in Group ABC.

The Protocol Independent Multicast (PIM) standard, together with Internet Group Management Protocol (IGMP) define the logical protocol entities that implement multicasting. These well-known protocols define a Multicast group, which represents a group of users that subscribe to the same information stream. Further defined are entities such as a Rendezvous Point (RP) that represents the root of a multicast tree connecting a sender (transmitting node) to the receivers (receiving nodes or networks) and to which all Multicast users subscribe in order to send and receive the multicast stream. A Sender represents a device that sends information to a multicast group and a Receiver represents a device that receives information destined for a multicast group. Further defined is a Designated Router (DR), which represents a local router within a subnet that sends registration packets to the RP on behalf of the senders or receivers and a Bootstrap Router (BSR) which represents a device containing a list of multicast candidate RPs within a PIM domain.

FIG. 3A illustrates an exemplary multicast network wherein IP packets from source 110.1 are transmitted though node 120.1, node 125.1, which is referred to as an RP, and node 130.1, which is referred to as a DR, to networks 140.1-140.3 in Group ABC. Also illustrated is the transmission from source 110.1, through nodes 120.2, 125.2, to RP node 125.1 and DR node 103.1 for subsequent transmission to networks 140.1-140.3 in Group ABC. In each of these cases, the multicast IP packets are processed through RP 125.1.

FIG. 3B illustrates the operation of transmission between autonomous systems (AS) 310, 320 using a MSDP protocol between RP 125.1 in AS 310 and RP 125.3 in AS 320. MSDP protocol is well-known to allow transmission of multicast packets between autonomous systems and need not be discussed in detail herein.

With the complexity of the multicast network configuration and the ability to add or remove nodes and networks from the multicast network, the identification and management of Multicast networks presents a burden on system administers as failures in configuration setup or physical node failures may be detrimental to only some aspects of the network operation and not others. For example, a failure in configuration setup, which is typically performed manually or, in cases, automatically, may cause nodes to be not responsive to data traffic flow or commands while a physical failure in a node may cause a complete or partial network failure operation. With reference to FIG. 3A, a failure occurring at node 125.1 will prevent networks 140.1-140.3 from receiving any data, whereas a failure occurring at node 125.2 will enable networks 140.1-140.3 to receive data from source 110.1 only.

Hence, there is a need in the industry for a method and system that can automate the management of the discovery of the configuration and operation of the multicast network layers and further determine and analyze the source of alarms generated at different levels of the network.

SUMMARY OF THE INVENTION

A method and apparatus for operating on a system containing a plurality of components in communication using multicast communication protocol is disclosed. The method comprises the steps of representing selected ones of the plurality of components, the relationship among the components and the associated with the communication protocols, determining a mapping between a plurality of events and a plurality of observable events occurring among the components and among the communication protocols, wherein the mapping is represented as a value associating each event with each observable event, and performing the system operation in conjunction with the relationship between the events and observable events.

BRIEF DESCRIPTION OF THE DRAWINGS

FIG. 6A illustrates an exemplary impact analysis of multicast protocols in accordance with the principles of the invention;

FIG. 6B illustrates an exemplary impact analysis of multicast protocols between autonomous systems in accordance with the principles of the invention;

Figure 1:
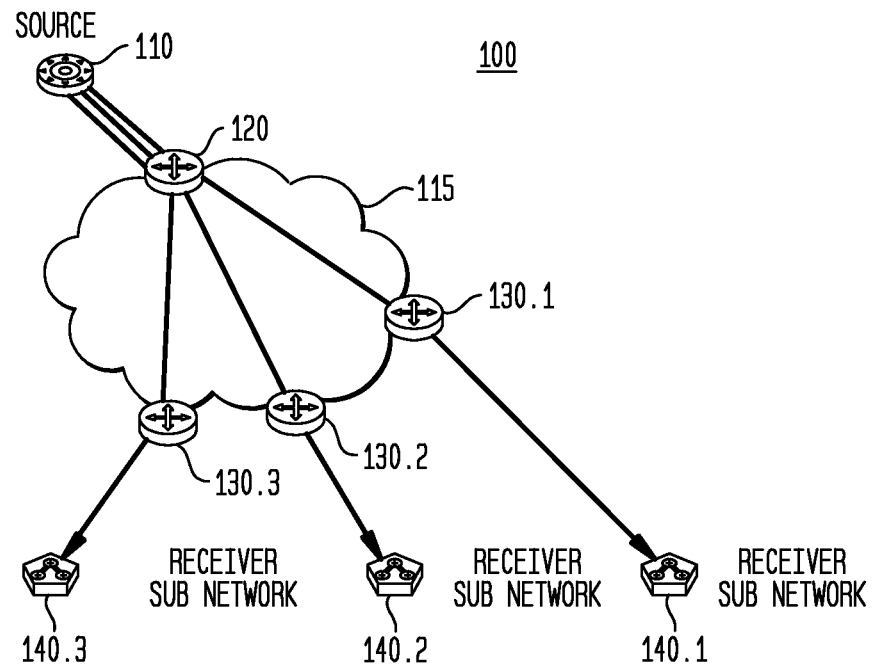
FIG. 1 illustrates an exemplary unicast network protocol routing configuration.
Figure 2:
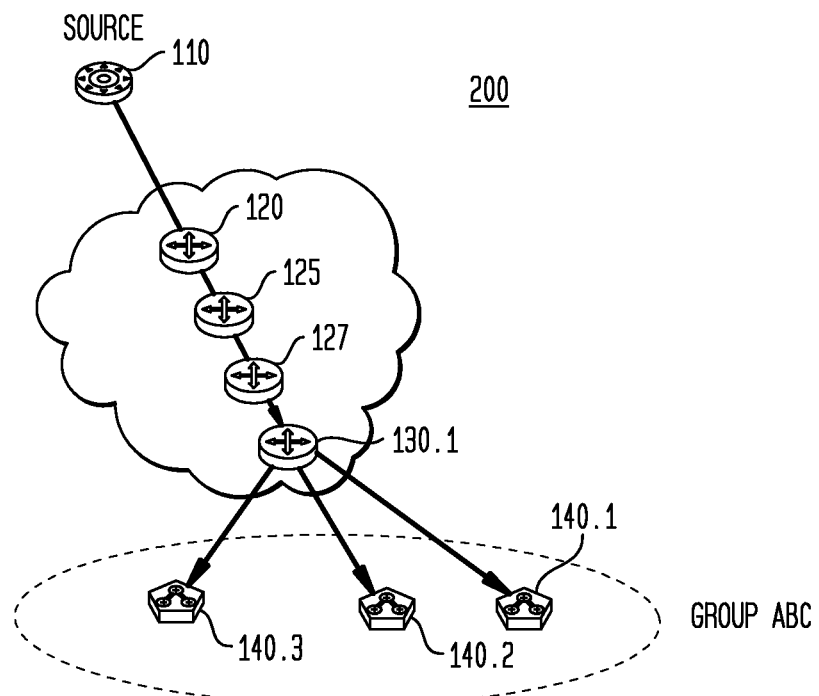
FIG. 2 illustrates an exemplary multicast network protocol routing configuration.
Figure 3A:
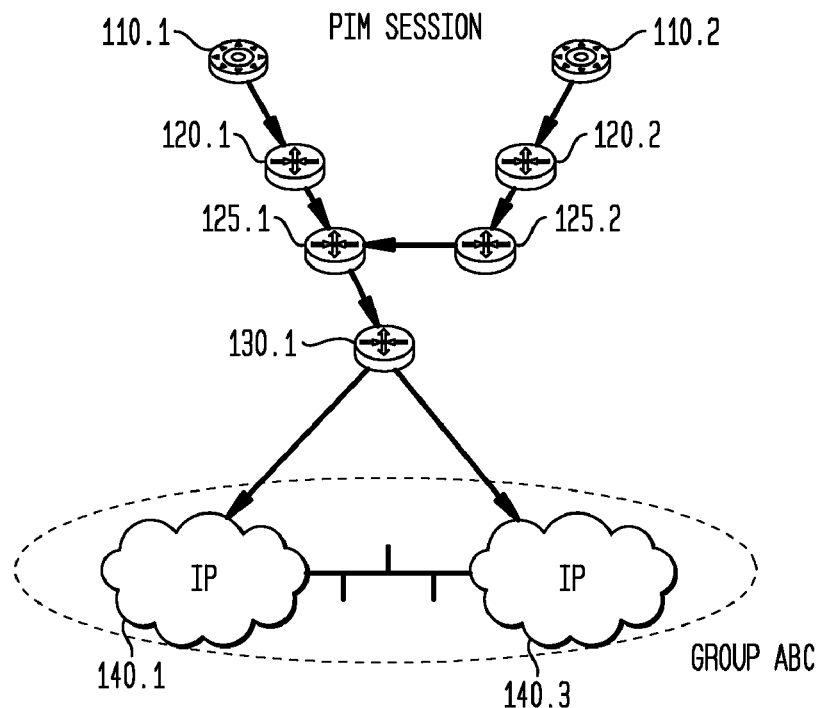
FIG. 3A illustrates exemplary multicast network protocol entities and associated routing configuration.
Figure 3B:
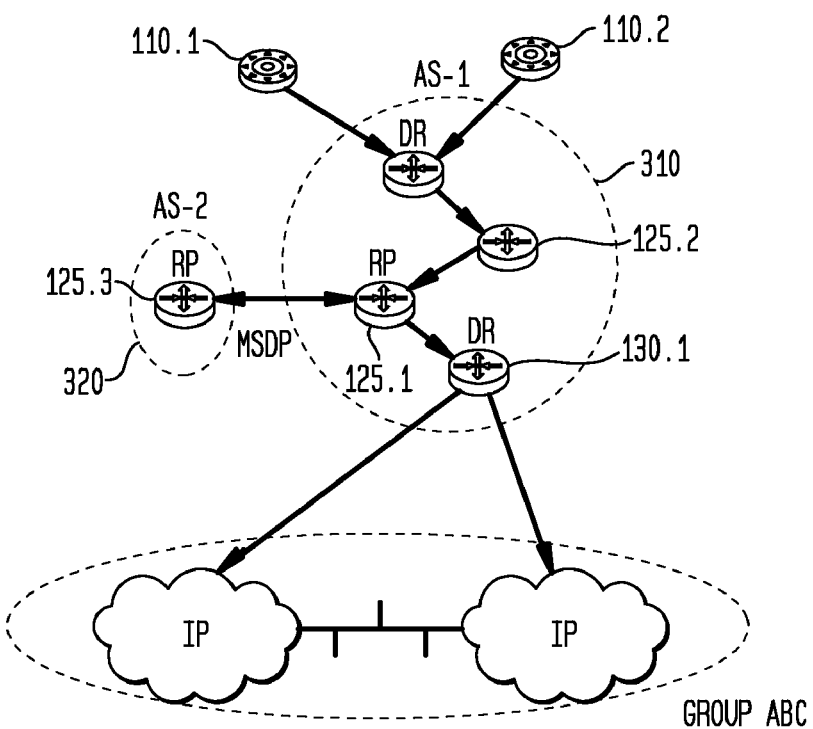
FIG. 3B illustrate exemplary multicast network protocol entities between autonomous systems.

It is to be understood that these drawings are solely for purposes of illustrating the concepts of the invention and are not intended as a definition of the limits of the invention. The embodiments shown in the figures herein and described in the accompanying detailed description are to be used as illustrative embodiments and should not be construed as the only manner of practicing the invention. Also, the same reference numerals, possibly supplemented with reference characters where appropriate, have been used to identify similar elements.

DETAILED DESCRIPTION

An exemplary framework for modeling common objects, relationships, behaviors, and interactions associated with protocol entities is now discussed in accordance with the principles of the invention. Although the invention describes and illustrates a specific model, the principles of the invention are applicable to any modeling approach and are not limited by the model proposed or by the specific proposed modeling approach. In the models are that presented, the names assigned to the classes reflect the multicast entity being represented and used for illustrative purposes only.

Figure 4A:
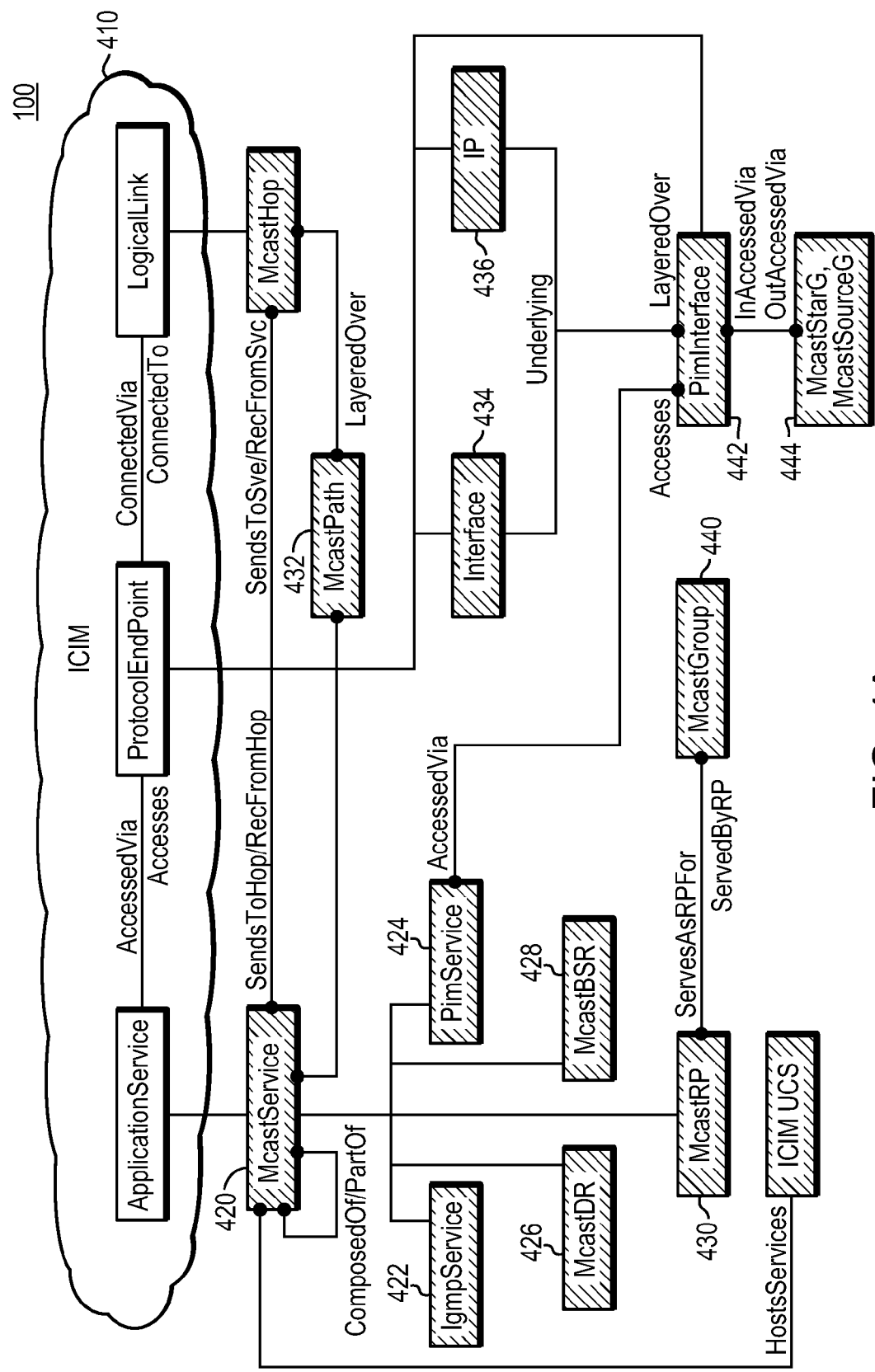
FIG. 4A illustrates a first exemplary model-based class hierarchy for multicast protocols in accordance with the principles of the invention.

FIG. 4A illustrate a first exemplary embodiment of an abstract model 400 in accordance with the principles of the present invention. The model shown is an extension of known network models, such as the SMARTS® InCharge™ Common Information Model (ICIM), or similarly defined or pre-existing CIM-based model. SMARTS and Incharge are trademarks of EMC Corporation, Inc., having a principle place of business in Hopkinton, Ma, USA. This model is an extension of the DMTF/SMI model. Model based system representation is also discussed in the commonly-owned referred to related US Patents and Patent Application. As would be appreciated, the objects and relationships described herein are independent of the specific network configuration (i.e., configuration non-specific) and present parameters or attributes of the components or operations comprising the network.

In this illustrative embodiment, the multicast protocol entities are associated with the objects of the ICIM application services ("ApplicationService"), protocol end points ("ProtocolEndPoint"), and logical links ("LogicalLink"). The object "ApplicationService" is related to "ProtocolEndPoint" via the "AccessVia/Accesses" relationship representing that an application service is related to and can access a protocol endpoint. In turn, the object "ProtocolEndPoint" is related to the object "LogicalLink" via the "ConnectedVia/ConnectedTo" relationship representing that a protocol end point is connected via a logical link to another protocol end point.

Further illustrated is a multicast services ("McastService") object that is a type of application service. The multicast hop ("McastHop") is one of the hops of the multicast service. The "McastService" sends to/receives from the "McastHop" object via the "SendsToHop/RecFromHop" relationship. In turn, the "McastHop" object can use the "McastService" via the "SendsToSvc/RecFromSvc" relationship. A multicast path objecte ("McastPath") is layered over ("LayeredOver" relationship) a collection of multicast hops ("McastHop").

The "ProtocolEndPoint" is composed of an interface ("Interface") and an IP address ("IP"). A PIM interface ("PimInterface") is related to the "Interface" and "IP" via the "Underlying/LayeredOver" relationship indicating that the PIM interface uses a specific interface with a specific IP address. The PIM interface can be used either to send or receive the data packets. The "McastStarG, and "McastSourceG" objects represent the IP multicast routing blocks that provide the mapping between the multicast group and the incoming/outgoing interfaces. "McastStarG, and "McastSourceG" objects can access the "PimInterface" as incoming ("InAccessedVia") or as outgoing ("OutAccessedVia").

The model represents the types of multicast services and the "McastService" object may inherit attributes from "ApplicationService". The services can be, for example, a PIM service ("PimService") that further accesses a "PimInterface" via the indicated "AccessedVia/Accesses" relationship; an IGMP service ("IgmpService"); a DR service ("McastDR"); a BSR service ("McastBSR") or a RP services ("McastRP"), which is related through the "ServesAsRPFor/ServedByRP" relationship with the multicast group ("McastGroup") to indicate that the RP serves the multicast group.

These services are further related to the object Unitary Computing Systems ("ICIM_UCS") through the "HostedBy/HostsServices" relationship, representing that the service is executing at a UCS (such as a host, router, switch, etc.). The "McastService" objects are in turn related to sub-services (or service, RP service, etc.) via the "ComposedOf/part of" relationship.

Figure 4B:
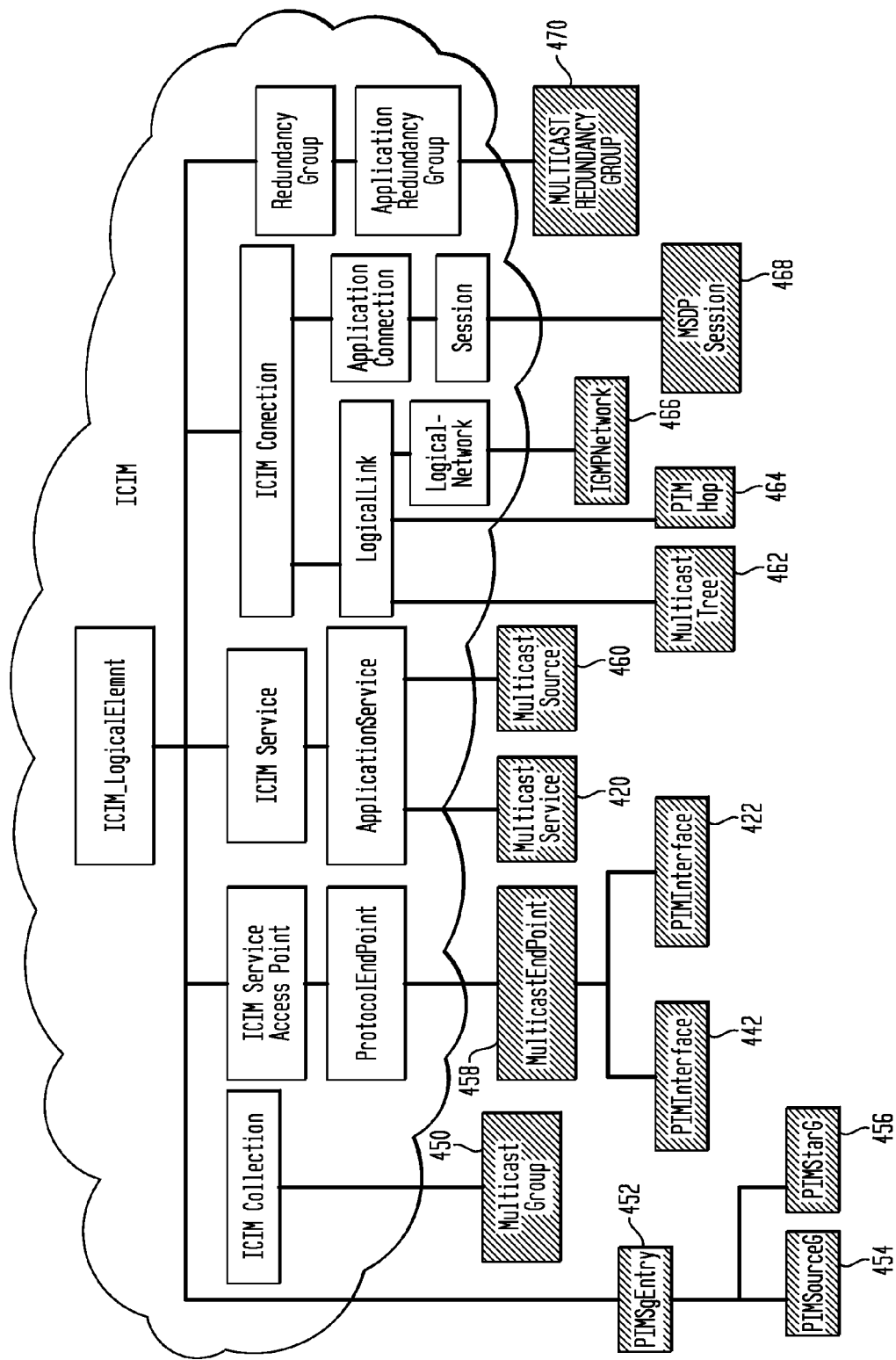
FIG. 4B illustrates a second exemplary model-based class hierarchy for multicast protocols in accordance with the principles of the invention.

FIG. 4B illustrates a second exemplary embodiment of an abstract model in accordance with the principles of the present invention. The model shown, similar to that shown in FIG. 4A, is an extension of known network models, such as the SMARTS® InCharge™ Common Information Model (ICIM), or similarly defined or pre-existing CIM-based model. In this exemplary embodiment, the objects of the multicast protocol are extensions of the existing ICIM objects, ICIM_Collection, ProtocolEndPoint, ApplicationServices, LogicalLInk, ApplicationConnection, and Application RedundancyGroup. In this case, the MulticastService 420 represents a process running on a system and managing the multicast functionality. It may include the capabilities of PIM forwarding, IGMP message handling, Designated Router, Bootstrap Router MSDP peering. The PIMInterface object 442 represents the PIM interface which has the capability of receiving and sending multicast traffic. This object has a LayeredOver relationship to the physical interface and is hosted by (HostedBy relationship) a router, as shown in FIG. 5B. The IGMPInterface object 422 represents the communication with IGMP applications. The IGMPInterface object is LayeredOver a physical interface, as shown in FIG. 5C. The MulticastGroup object 450 represents the IP multicast address designating IP multicast traffic forwarding entity. This object may also hold additional information such as the RP address which it services. The PIMStarG and PimSourceG objects 456, 454, respectively, provide mapping between multicast groups and the incoming/outgoing interfaces within the multicast enabled router. The PIMHop object 464 represents a connection between two multicast-enabled routers. The MulticastTree object 462 represents a route connecting the sender and the receiver and is LayeredOver all the multicast hops between the source and the receiver. The IGMPNetwork object 466 represents an IP subnet receiver application which receives traffic pertaining to specific a multicast group. The MulticastSource object 460 represents an IP multicast transmitter which sends multicast data pertaining to a specific group.

Figure 5A:
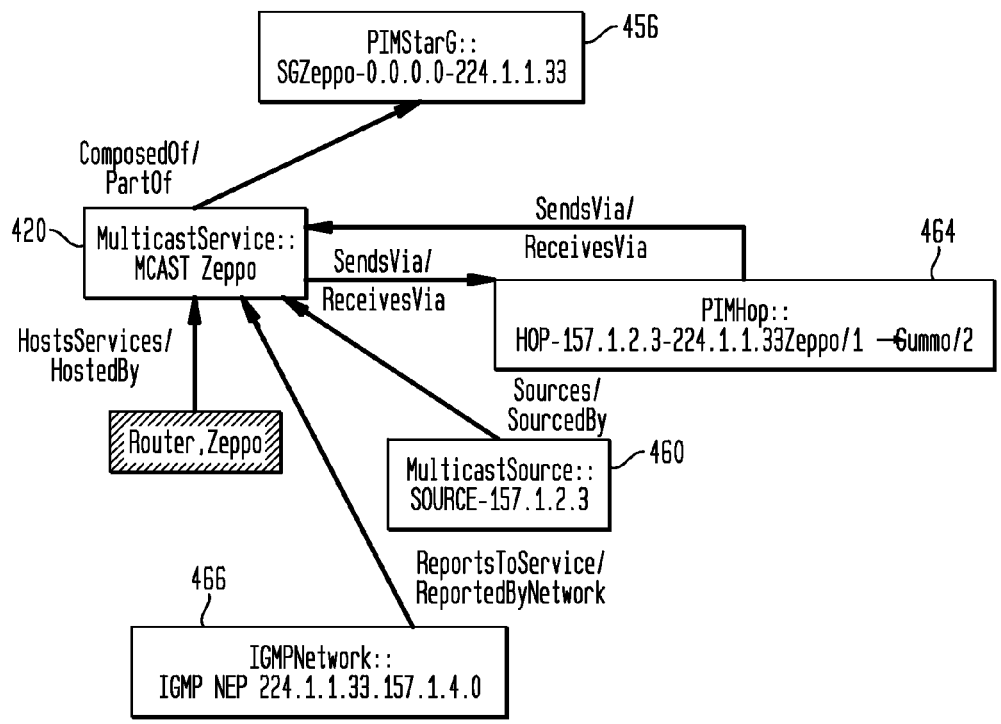
FIGS. 5A-5J collectively illustrate relationships between the objects of the model-based class hierarchy shown in FIG. 4B.
Figure 5B:
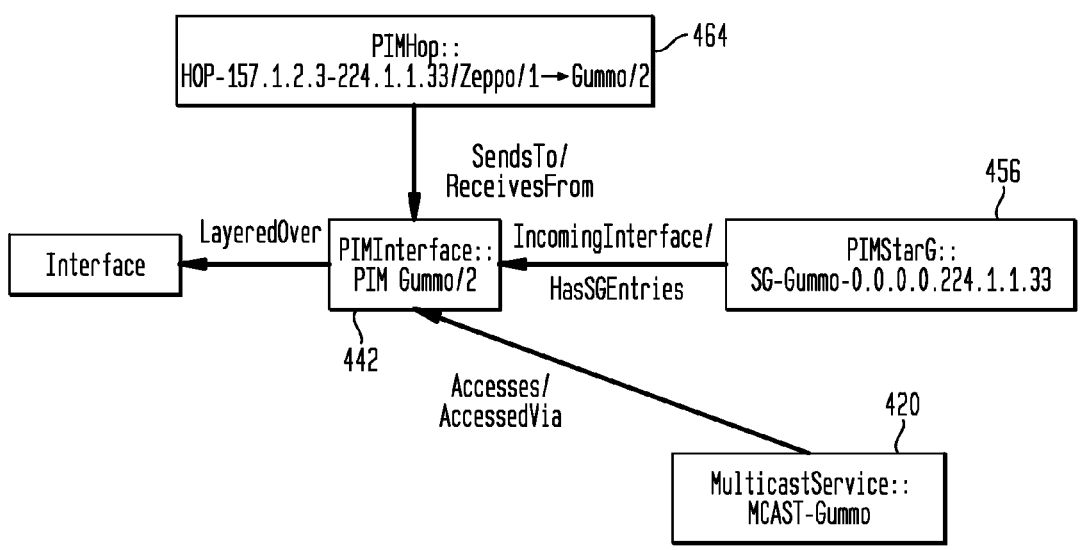
Figure 5C:
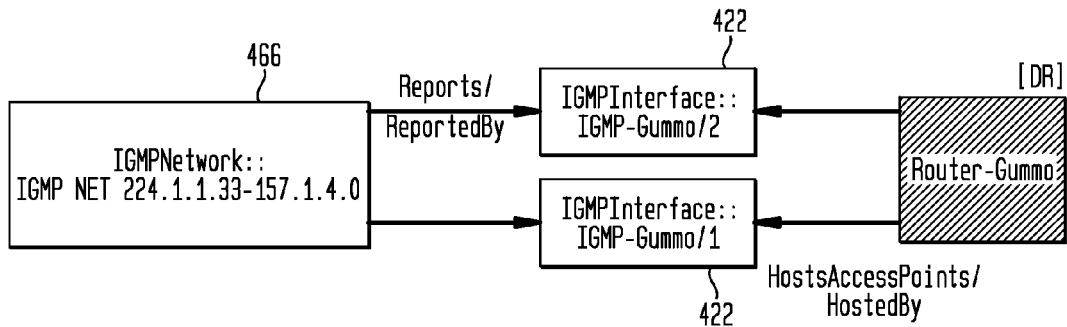
Figure 5D:
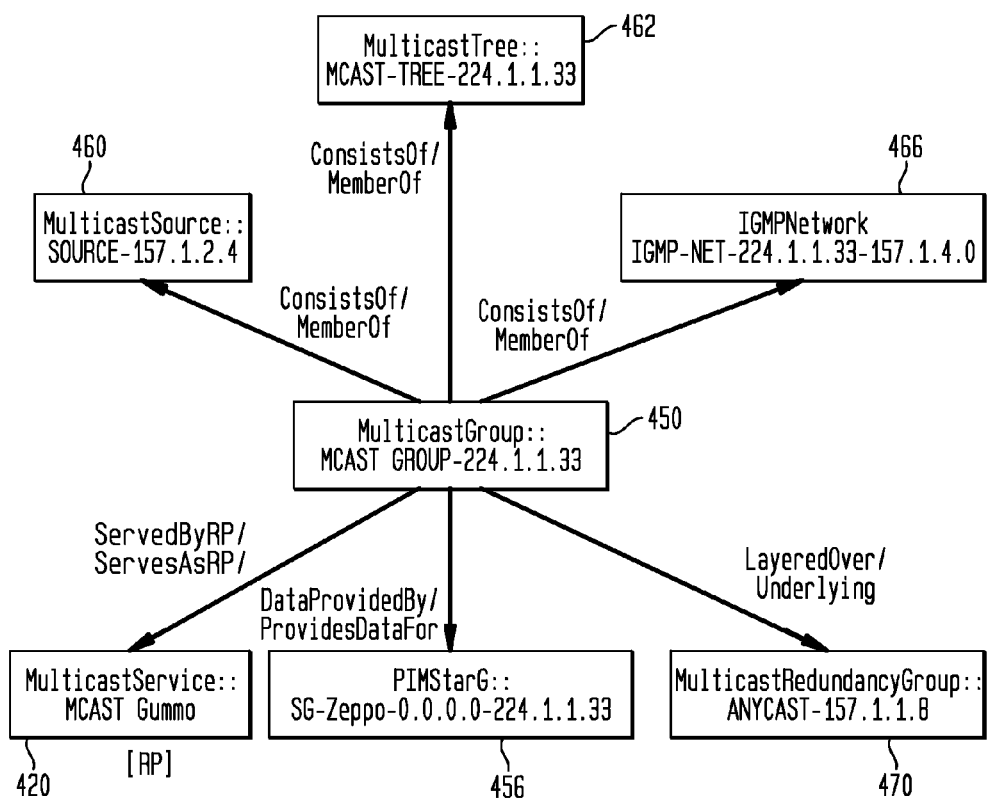
Figure 5E:
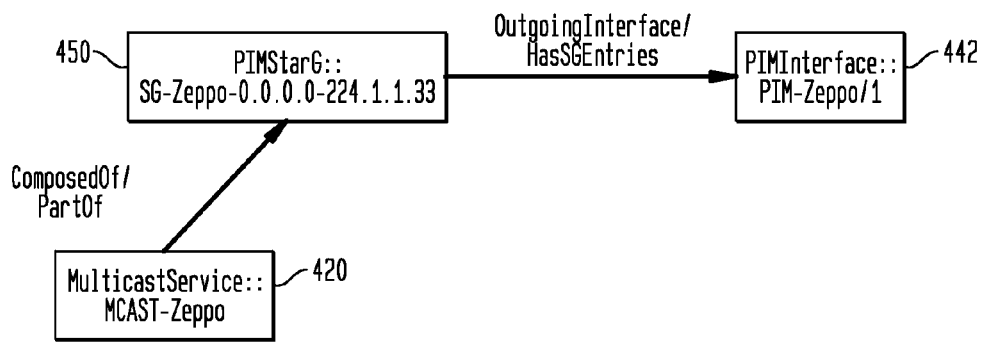
Figure 5F:
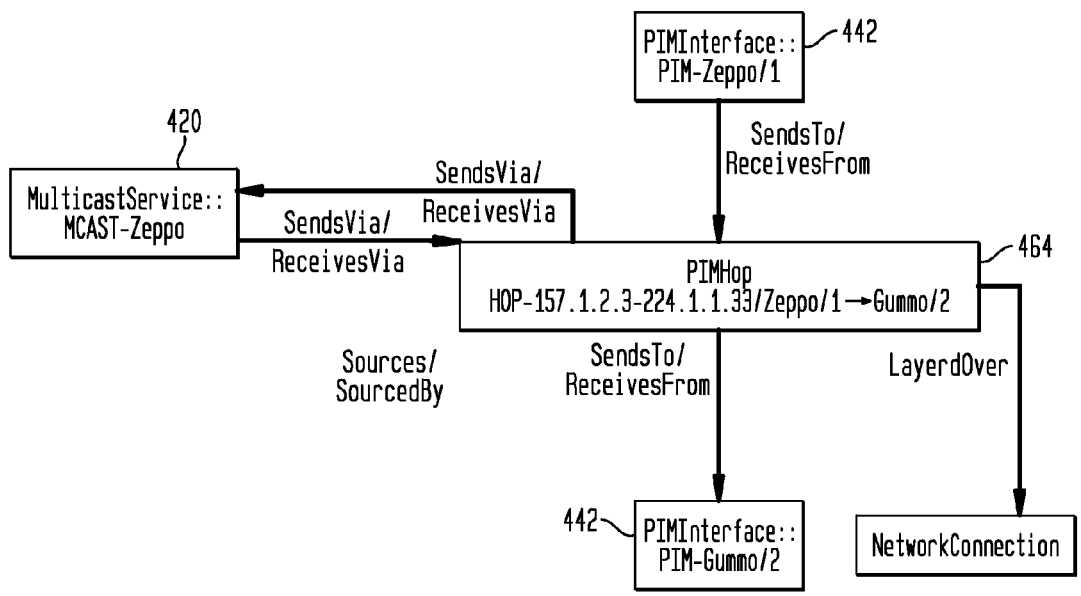
Figure 5G:
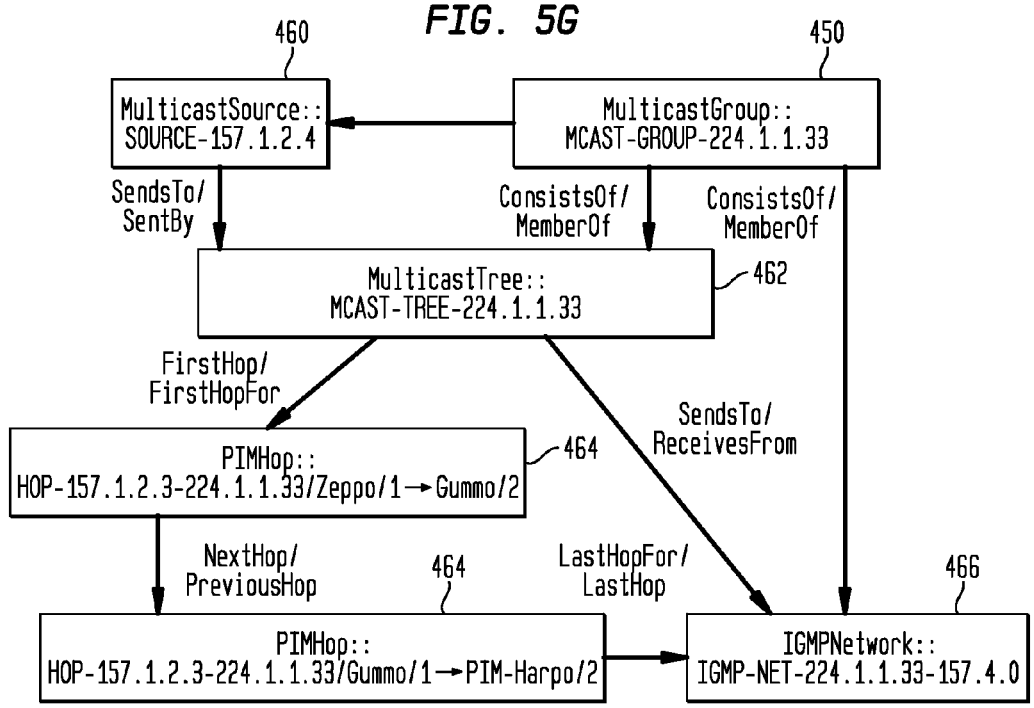
Figure 5H:
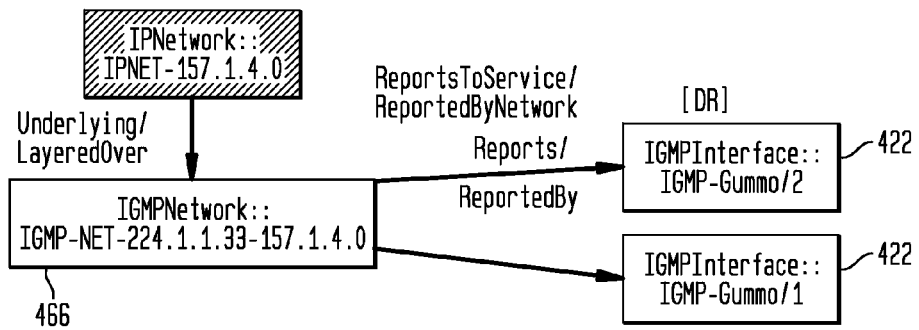
Figure 5I:
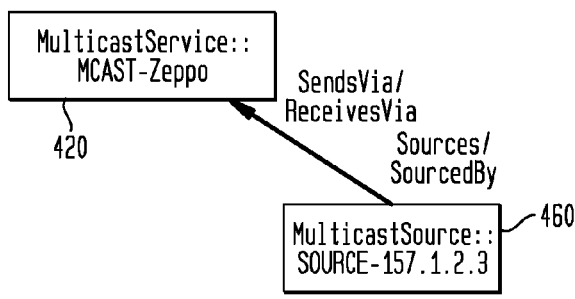

FIGS. 5A-5I illustrate relationships or behaviors between specific objects shown in FIG. 4B. FIG. 5A, for example, illustrates that the MulticastService object 420 is located on router-zeppo and possesses a "HostedBy" relationship with the router-zeppo Router-zeppo further possesses a "HostServices" relationship with MulticastServices object 420. MulticastService 420 further possesses a "ReportsToService/ReportedByNetwork" relationship with object IGMPNetwork 466. Similar relationships are shown for the MultcastSource 460, PIMHop 464 and PIMStarG 456 objects. As would be recognized, in this case, the router identification or name is zeppo.

Figure 5J:
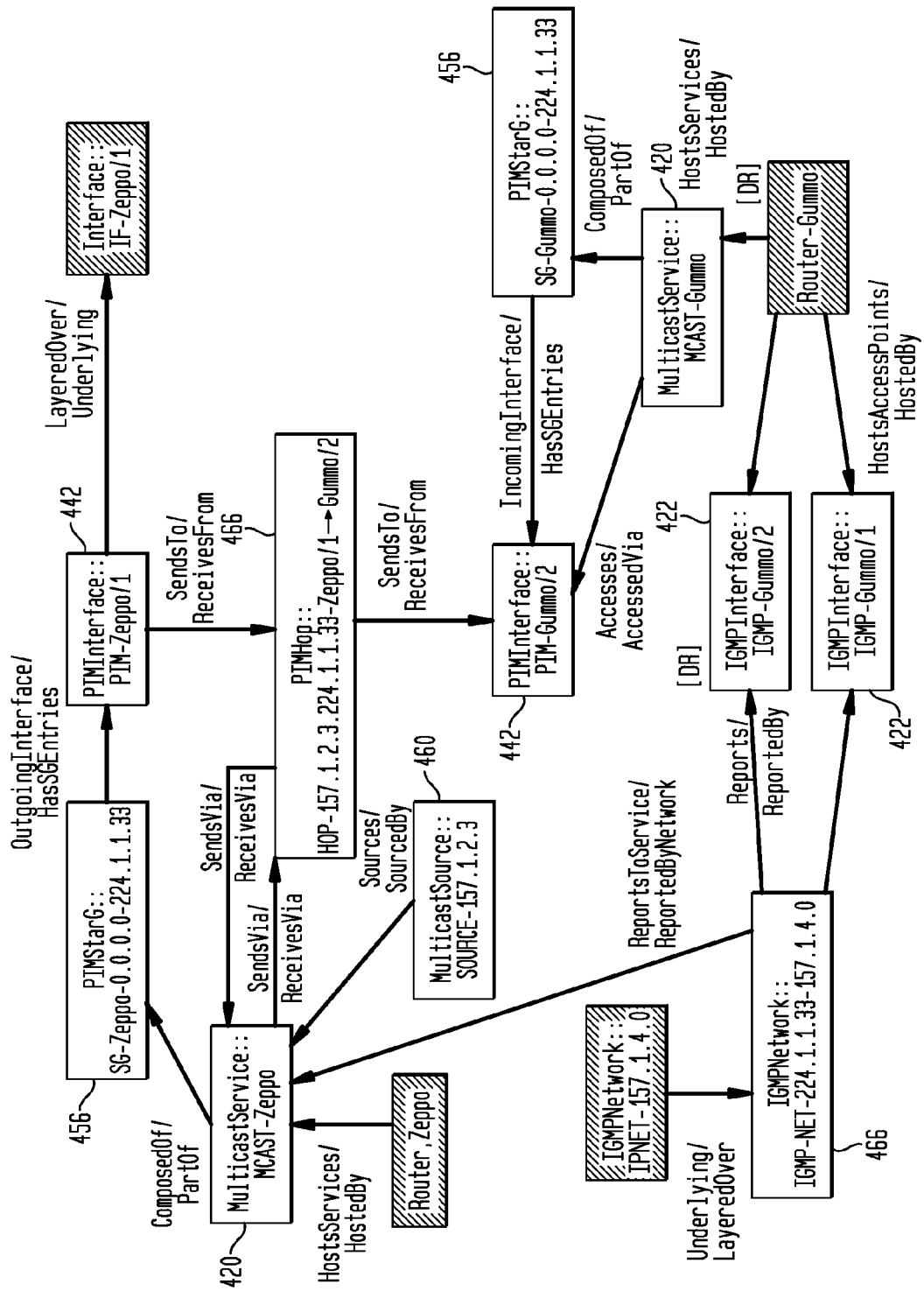

FIG. 5J illustrates a composite of the objects and relationships, excluding the multicast group, shown in FIGS. 5A-5I. It would be within the skill of those practicing in the field to develop similar composite of objects and relationships for the multicast group based on the teachings of FIGS. 5A-5I.

One source of instrumentation of the objects in the models disclosed is the well-known SNMP MIBs. Some information regarding the components involved in the multicast protocol may be also be retrieved from a Protocol Information Management (PIM)-MIB, which provides information regarding general multicast capabilities, —i.e., BSR capabilities, RP capacities and PIM interfaces. Information may also be provided by an IGMP-MIB, which provides information regarding interfaces—i.e., IGMP interfaces, Per-interface last reporter and Per-interface querier. Similarly, an IPMROUTE-MIB may provide information regarding Multicast routing information and Neighboring relationships, and a MSDP-MIB may provide information regarding MSDP General Capabilities, MSPD Peering Relationships and MSDP Peering Status. The PIM-MIB, IGMP-MIB, IPMROUTE-MIB and MSDP-MIB are data structures located in routers or nodes in the network and are well-known in the art. Hence, a detailed discussion of the operation or content of the MIBs need not be discussed in detail herein.

In one aspect of the invention, instances of the disclosed model objects may be determined during an initialization phase or upon a periodic investigation or when a change is detected in the network. In this case, the multicast discovery retrieves from resource repositories a complete list of managed devices, and checks for supported IP Multicast applications such as Multicast Forwarding, Multicast Designated Router, Multicast Bootstrap Router, etc. In this case, each device managed may be probed to discover the IP Multicast entities such as PIM interfaces, IGMP interfaces, IPM-ROUTE entries etc. Probing may be performed for example by issuing SNMP get commands.

When an IP Multicast resource is discovered, such as PIM interface, it is represented by creating the necessary objects, and relationship between them and the underlying physical network element. The physical interface in this case, may be imported from a known repository of such information.

The models of the multicast protocol can be used to perform several forms of analysis of the represented network. These forms of analysis include but are not limited to design, simulation, operations management, event propagation, impact analysis, and root-cause analysis of problems.

FIG. 6A illustrates an exemplary impact analysis notifications associated with multicast protocols in accordance with the principles of the invention. In this exemplary impact analysis, when a PIMInterface entity, for example, is determined to be impacted or have generated an alarm or symptom, the cause of the impact is related to a physical failure. A diagnosis of the physical failure may be an OSI (Open Source Interface) layer 2 or layer 3 failure. This failure may further cause all PIM communications to be impacted.

FIG. 6B illustrates an exemplary impact analysis notifications associated with multicast protocols in redundancy groups in accordance with the principles of the invention. In this exemplary impact analysis when a MulticastRedundancyGroup entity is determined to be impacted or have generated an alarm or symptom, the cause of the impact may be related to one or more of the elements of the redundancy group has failed.

Figures 6C, 7A:
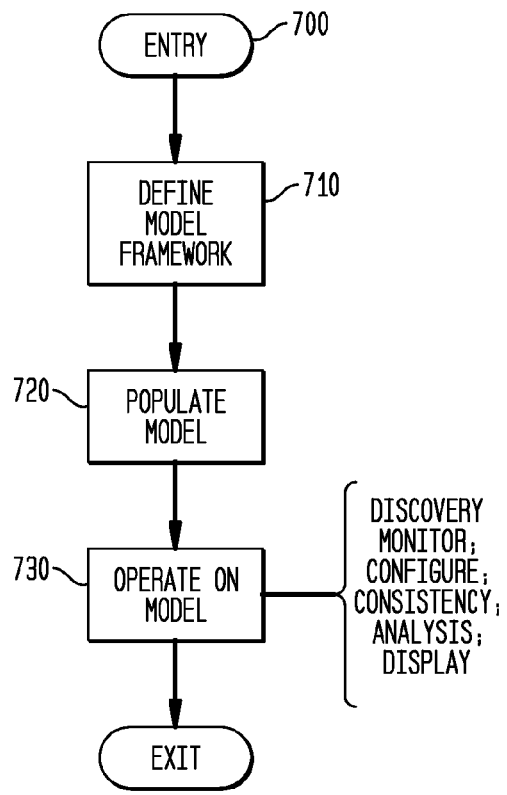
FIG. 6C illustrates an exemplary performance analysis of multicast protocols in accordance with the principles of the invention.
FIG. 7A illustrates a flow chart of an exemplary process in accordance with the principles of the invention.

FIG. 6C illustrates an exemplary performance analysis associated with multicast protocols in accordance with the principles of the invention. In this exemplary analysis, when a Multicast Group entity is diagnosed as having excessive traffic and generates an alarm to that effect, the cause of the generation of the alarm is that the traffic through a monitored entity (i.e., node) exceeds a threshold for the node.

Although FIGS. 6A-6C illustrate exemplary impact and performance analysis, it would be understood by those skilled in the art that this illustrated entities are only shown for purposes of illustrating the principles of the invention and are not limited to the entities illustrated.

FIG. 7A illustrates a flowchart of an exemplary process 700 of Model-Based Protocol Management (MB-PM) in accordance with the principles of the present invention. In this exemplary process, at block 710, a model framework for the modeling protocol entities, relationships, behaviors and interactions is defined. The model is an abstraction of the underlying hardware and software components. Although the present invention has been described with regard to an ICIM model, any modeling technique can be applied at this stage. At block 720, the model is populated with protocol entity, relationship, behavior and interaction instances for a managed environment. In this case, well-known algorithms, databases and techniques may be applied to retrieve information from the configuration of the instances of the modeled protocol entities to populate the defined model with the device details discovered. Discovery of information may further include the discovery of the types of networks. As one skilled in the art would recognize the discovery may be done automatically or manually.

At block 730, operation on the environment through the instantiated model may be performed. For example, operations may comprise monitoring the underlying protocol entities to verify that the global model is synchronized with the state of the underlying protocol entities, configuring or provisioning the protocol entities, configuring or checking the consistency of the protocol entity configurations, analyzing the state of the protocol entity model to detect configuration errors, global failure modes and health status of the protocol entities, and displaying/visualizing the components, objects and their relationships.

In another aspect of the invention, discovery of the state of introduced or removed components, elements or objects and their relationships, and populating the model after dynamic changes in the protocol entities of the system may be performed. In this aspect of the invention re-populating protocol entities and relationship instances of the managed environment may include, for example, a series of discovery algorithms and techniques to retrieve information regarding newly introduced, changed, or removed components, objects, or resources instances in the networked system.

As would be appreciated by those skilled in the art, the processes describe herein may be performed upon detection of a failure or may be run periodically or whenever a change in the topology occurs.

Figure 7B:
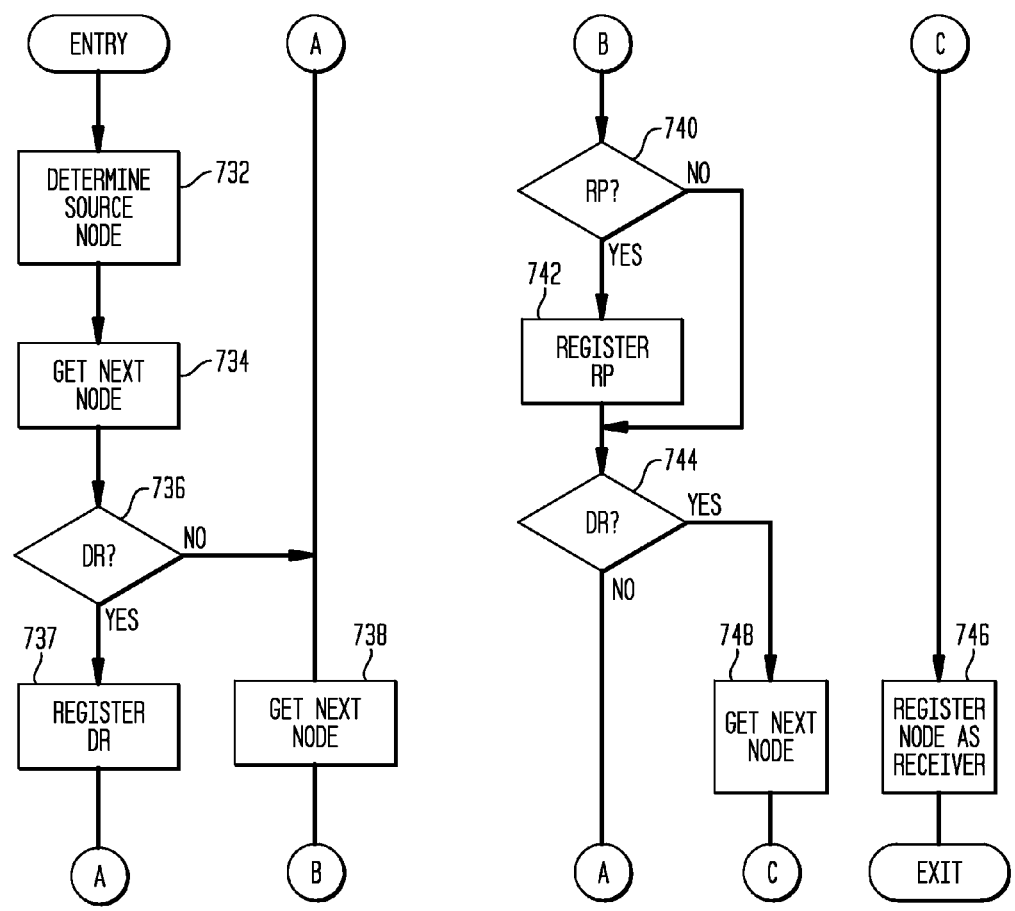
FIG. 7B illustrates a flow chart of an exemplary process for discovering multicast routes in accordance with the principles of the invention.

FIG. 7B illustrate a flowchart of an exemplary process for discovering multicast routes in accordance with the principles of the invention. In this illustrative process, a source node is determined at block 732. At block 734, a next node is obtained based on the routing tables in the determined source node. At block 736, a determination is made whether the obtained next node is a Designated Router node. If the answer is negative, the current node is stored and a next node is obtained at block 738.

However, if the answer is in the affirmative then the node is registered as a DR node at block 737 and a next node is obtained at block 738.

At block 740, a determination is made whether the obtained next node is an RP node. If the answer is in the affirmative, then the node is stored and registered as an RP node.

Otherwise, if the answer at block 740 is negative the processing continues at block 744, where a determination is made whether the obtained node is a DR node. If the answer is negative, then a next node is obtained at block 738.

However, if the answer at block 744 is in the affirmative, then a next node is obtained at block 748 and process continues at block 746, wherein the node is classified as a receiver node.

Figure 7C:
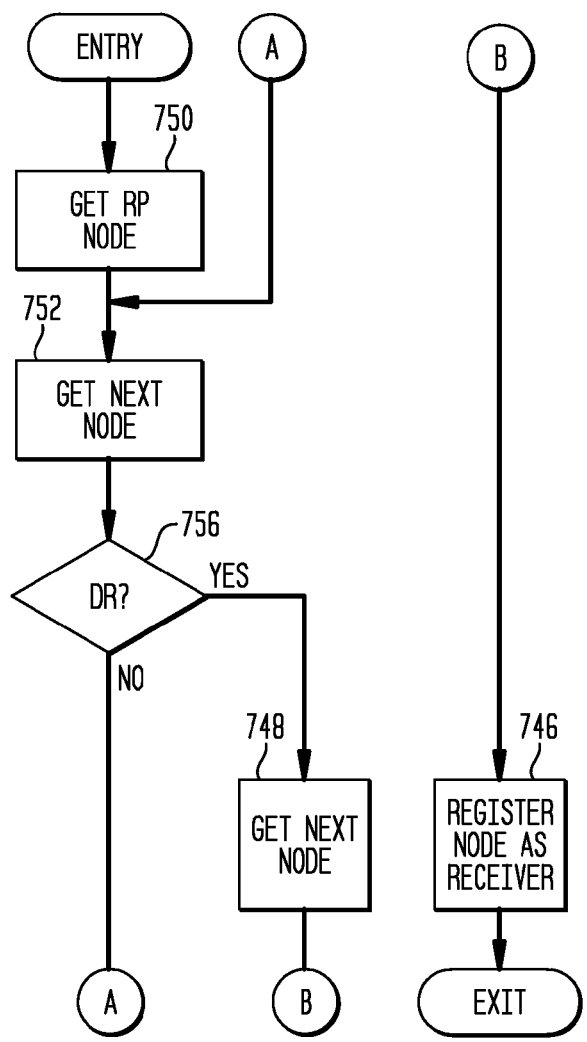
FIG. 7C illustrates a flow chart of a second exemplary process for discovering multicast routes in accordance with the principles of the invention.

FIG. 7C illustrates a second exemplary process for determining multicast routes in accordance with the principles of the invention. In this exemplary process, node designated as an RP node is determined at block 750. At block 752, a next node is determined using well-known information obtained in the routing tables. At block 756 a determination is made whether the node is a DR node. If the answer is negative, then a next node is obtained at block 752. Otherwise, the node is designated as a DR and a next node is determined at block 748. At block 746, the next node is deemed a receiving node.

Figure 7D:
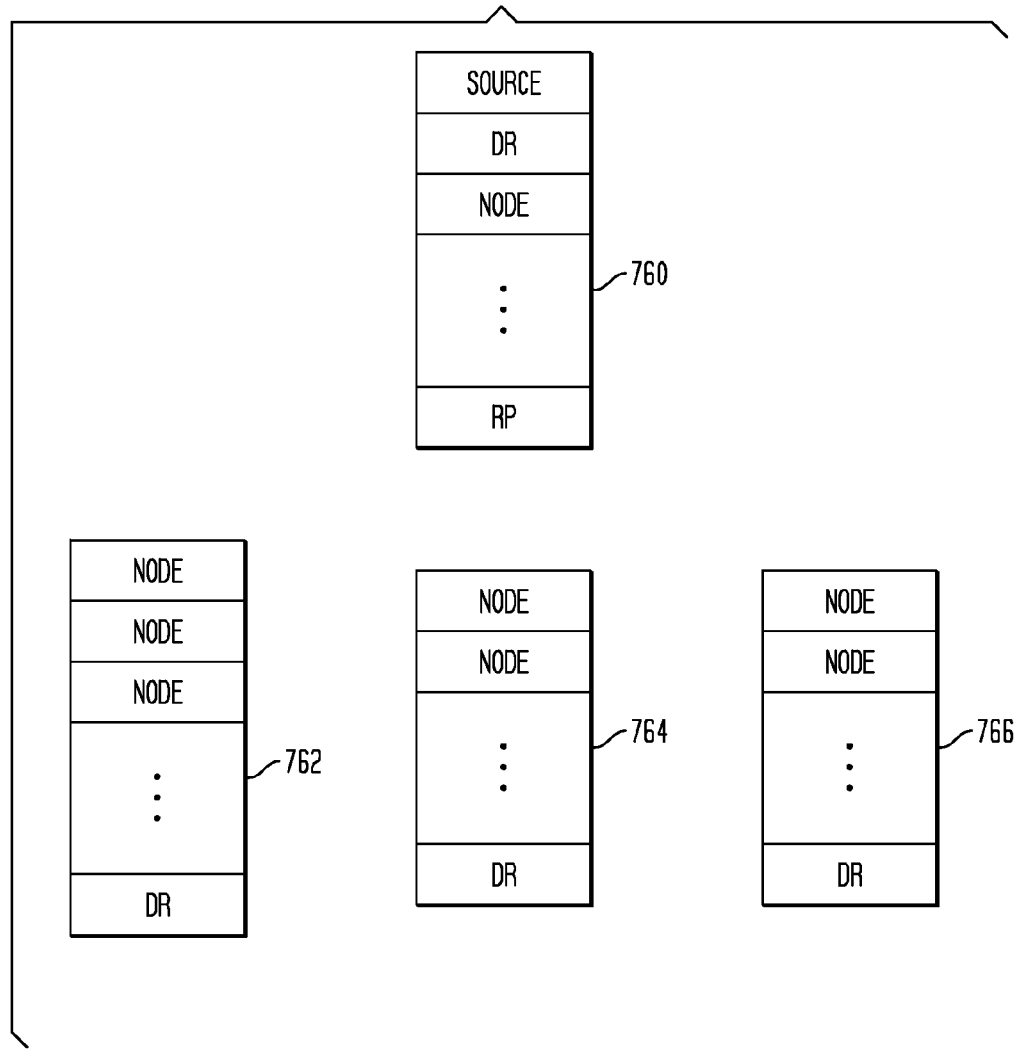
FIG. 7D illustrates an exemplary database from storing multicast protocol routes in one aspect of the invention.

FIG. 7D illustrates an exemplary data structure for storing information associated with the discovery processing shown herein. In this exemplary data structure, information from a source node to a designated RP node is contained in data block 760, whereas information from a node designated an RP node to receiver nodes is contained in data blocks 762, 764 and 766. It would be appreciated that information associated with block 760 and 762, for example, may be obtained from the processing shown in FIG. 7B, wherein information associated with data blocks 764 and 766 may be obtained from the processing shown in FIG. 7C.

Figure 8:
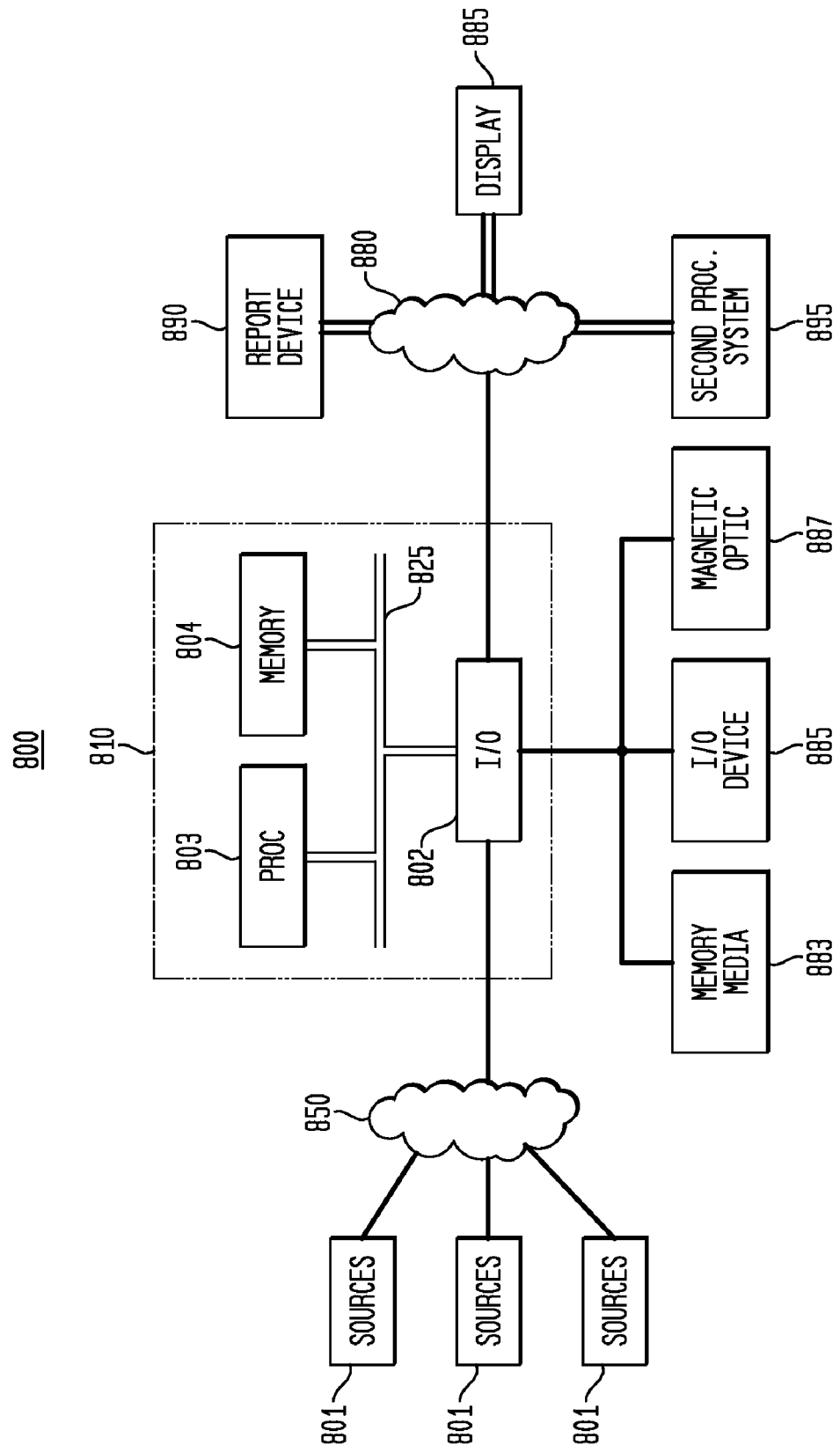
FIG. 8 illustrates an exemplary system for practicing the processes discloses herein.

FIG. 8 illustrates an exemplary embodiment of a system 800 that may be used for implementing the principles of the present invention. System 800 may contain one or more input/output devices 802, processors 803 and memories 804. I/O devices 802 may access or receive information from one or more sources or devices 801. Sources or devices 801 may be devices such as routers, servers, computers, notebook computer, PDAs, cells phones or other devices suitable for transmitting and receiving information responsive to the processes shown herein. Devices 801 may have access over one or more network connections 850 via, for example, a wireless wide area network, a wireless metropolitan area network, a wireless local area network, a terrestrial broadcast system (Radio, TV), a satellite network, a cell phone or a wireless telephone network, or similar wired networks, such as POTS, INTERNET, LAN, WAN and/or private networks, e.g., INTRANET, as well as portions or combinations of these and other types of networks.

Input/output devices 802, processors 803 and memories 804 may communicate over a communication medium 825. Communication medium 825 may represent, for example, a bus, a communication network, one or more internal connections of a circuit, circuit card or other apparatus, as well as portions and combinations of these and other communication media. Input data from the client devices 801 is processed in accordance with one or more programs that may be stored in memories 804 and executed by processors 803. Memories 804 may be any magnetic, optical or semiconductor medium that is loadable and retains information either permanently, e.g. PROM, or non-permanently, e.g., RAM. Processors 803 may be any means, such as general purpose or special purpose computing system, such as a laptop computer, desktop computer, a server, handheld computer, or may be a hardware configuration, such as dedicated logic circuit, or integrated circuit. Processors 803 may also be Programmable Array Logic (PAL), or Application Specific Integrated Circuit (ASIC), etc., which may be "programmed" to include software instructions or code that provides a known output in response to known inputs. In one aspect, hardware circuitry may be used in place of, or in combination with, software instructions to implement the invention. The elements illustrated herein may also be implemented as discrete hardware elements that are operable to perform the operations shown using coded logical operations or by executing hardware executable code.

In one aspect, the processes shown herein may be represented by computer readable code stored on or provided by a computer readable medium. The code may also be stored in the memory 804, for example, or may be read or downloaded from memory medium 883, or an I/O device 885 or magnetic or optical media, such as a floppy disk, a CD-ROM or a DVD, 887 and then stored in memory 804. The code may, in one aspect of the invention, be electronically downloaded over one or more of the illustrated networks or through input/output device 885. As would be appreciated, the code may be processor-dependent or processor-independent. JAVA is an example of processor-independent code. JAVA is a trademark of the Sun Microsystems, Inc., Santa Clara, Calif. USA.

Information received by I/O device 802, after processing in accordance with one or more software programs operable to perform the functions illustrated herein, may also be transmitted over network 880 to one or more output devices represented as display 885, reporting device 890 or second processing system 895.

As one skilled in the art would recognize, the term computer or computer system may represent one or more processing units in communication with one or more memory units and other devices, e.g., peripherals, connected electronically to and communicating with the at least one processing unit. Furthermore, the devices may be electronically connected to the one or more processing units via internal busses, e.g., ISA bus, microchannel bus, PCI bus, PCMCIA bus, etc., or one or more internal connections of a circuit, circuit card or other device, as well as portions and combinations of these and other communication media or an external network, e.g., the Internet and Intranet.

While there has been shown, described, and pointed out fundamental novel features of the present invention as applied to preferred embodiments thereof, it will be understood that various omissions and substitutions and changes in the apparatus described, in the form and details of the devices disclosed, and in their operation, may be made by those skilled in the art without departing from the spirit of the present invention. It would be recognized that the invention is not limited by the model discussed, and used as an example, or the specific proposed modeling approach described herein. For example, it would be recognized that the method described herein may further be used to perform system analysis that may include: fault detection, fault monitoring, performance, congestion, connectivity, interface failure, node failure, link failure, routing protocol error, routing control errors, and root-cause analysis.

It is expressly intended that all combinations of those elements that perform substantially the same function in substantially the same way to achieve the same results are within the scope of the invention. Substitutions of elements from one described embodiment to another are also fully intended and contemplated.

What is claimed is:

1. A method for operating on a system containing a plurality of components communicating using a multicast communication protocol, the method comprising the steps of:
    representing, in a non-user acceptable manner, selected ones of the plurality of components in a model on one or more computers, the relationship among the components and the associated with the communication protocols; wherein the step of representing the at least one communication protocol comprises the steps of creating at least one non-specific representation of the multicast protocol selected from the group consisting of: MulticastGroup, PIMSgEntry, PIMSourceG, PIMStarG, MulticastEndPoint, PIMInterface, IGMPInterface, MulticastService, MulticastSource, MulticastTree, PIMHop, IGMPNetwork, MSDPSession and MultcastReducancyGroup; and creating at least one non-specification representation of relations along which the events propagate amongst the multicast protocol, wherein the representations of relations are selected from the group consisting of: SendsVia, ReceivesVia, Sources/SourcedBy, ConnectedSystem, ConsistsOf, ConnectedTo, AccessedVia, HostServices, HostedBy, ComposedOf, part of, ReportsToService, ReportedByNetwork, SendsTo, ReceivedFromand LayeredOver;
    determining a mapping between a plurality of events and a plurality of observable events occurring among the selected components, wherein the mapping is represented as a value associating each event with each observable event, and
    performing the system operation in conjunction with the relationship between the events and observable events.

2. The method as recited in claim 1, wherein the operation is selected from the group consisting of: monitoring, discovering, managing, analyzing and displaying.

3. The method as recited in claim 2, wherein the analyzing operation is selected from the group consisting of: root-cause, impact, performance.

4. An apparatus for operating on a system containing a plurality of components communicating using a multicast communication protocol, the apparatus comprising:
    a processor in communication with a memory, the processor executing code for:
        representing, in a non-user acceptable manner, selected ones of the plurality of components in a model on one or more computers, the relationship among the components and the associated with the communication protocols; wherein the processor executing code for representing the at least one communication protocol comprises the steps of:
    creating at least one non-specific representation of the multicast protocol selected from the group consisting of: MulticastGroup, PIMSgEntry, PIMSourceG, PIMStarG, MulticastEndPoint, PIMInterface, IGMPInterface, MulticastService, MulticastSource, MulticastTree, PIMHop, IGMPNetwork, MSDPSession and MulticastReducancyGroup; and creating at least one non-specification representation of relations along which the events propagate amongst the multicast protocol, wherein the representations of relations are selected from the group consisting of: SendsVia, ReceivesVia, Sources/SourcedBy, ConnectedSystem, ConsistsOf, ConnectedTo, AccessedVia, HostServices, HostedBy, ComposedOf, part of, ReportsToService, ReportedByNetwork, SendsTo, ReceivedFromand LayeredOver;
        determining a mapping between a plurality of events and a plurality of observable events occurring among the selected components, wherein the mapping is represented as a value associating each event with each observable event, and
        performing the system operation in conjunction with the relationship between the events and observable events.

5. The apparatus as recited in claim 4, wherein the operation is selected from the group consisting of: monitoring, discovering, managing, analyzing and displaying.

6. The apparatus as recited in claim 4, wherein the analyzing operation is selected from the group consisting of: root-cause, impact, performance.

7. A non-transitory computer-readable storage medium providing code for providing instruction to a processor for operating on a system containing a plurality of components communicating using a multicast communication protocol, the code instructing the processor to execute the steps of:

representing, in a non-user acceptable manner, selected ones of the plurality of components in a model on one or more computers, the relationship among the components and the associated with the communication protocols; wherein the code providing instruction to the processor for representing the at least one communication protocol comprises the steps of: creating at least one non-specific representation of the multicast protocol selected from the group consisting of: MulticastGroup, PIMSgEntry, PIMSourceG, PIMStarG, MulticastEndPoint, PIMInterface, IGMPInterface, MulticastService, MulticastSource, MulticastTree, PIMHop, IGMPNetwork, MSDPSession and MultcastReducancyGroup; and creating at least one non-specification representation of relations along which the events propagate amongst the multicast protocol, wherein the representations of relations are selected from the group consisting of: SendsVia, ReceivesVia, Sources/SourcedBy, ConnectedSystem, ConsistsOf, ConnectedTo, AccessedVia, HostServices, HostedBy, ComposedOf, part of, ReportsToService, ReportedByNetwork, SendsTo, ReceivedFromand LayeredOver;

determining a mapping between a plurality of events and a plurality of observable events occurring among the selected components, wherein the mapping is represented as a value associating each event with each observable event, and performing the system operation in conjunction with the relationship between the events and observable events.

8. The non-transitory computer-readable medium as recited in claim 7, wherein the operation is selected from the group consisting of: monitoring, discovering, managing, analyzing and displaying.

9. The non-transitory computer-readable medium as recited in claim 7, wherein the analyzing operation is selected from the group consisting of: root-cause, impact, performance.

* * * * *